United States Patent
Shibata

(10) Patent No.: US 7,046,479 B2
(45) Date of Patent: May 16, 2006

(54) MAGNETIC RECORDING/REPRODUCING DEVICE HAVING POSITION CONTROL

(75) Inventor: Hideyo Shibata, Hirakata (JP)

(73) Assignee: Matsushita Electric Industrial Co., Ltd., (JP)

( * ) Notice: Subject to any disclaimer, the term of this patent is extended or adjusted under 35 U.S.C. 154(b) by 321 days.

(21) Appl. No.: 10/415,905

(22) PCT Filed: Nov. 8, 2001

(86) PCT No.: PCT/JP01/09799

§ 371 (c)(1),
(2), (4) Date: May 5, 2003

(87) PCT Pub. No.: WO02/39444

PCT Pub. Date: May 16, 2002

(65) Prior Publication Data

US 2004/0027710 A1    Feb. 12, 2004

(30) Foreign Application Priority Data

Nov. 10, 2000  (JP) .............................. 2000-342721

(51) Int. Cl.
G11B 5/584  (2006.01)
G11B 15/12  (2006.01)
H01N 5/95  (2006.01)
(52) U.S. Cl. .................. 360/77.14; 360/61; 386/85
(58) Field of Classification Search ............ 360/77.12, 360/70, 77.13, 55, 77.14, 61, 13, 64, 73.04, 360/73.11, 73.12, 73.14; 386/78, 79, 80
See application file for complete search history.

(56) References Cited

U.S. PATENT DOCUMENTS 5,546,248 A * 8/1996 Sakakibara et al. ...... 360/77.14
5,589,992 A * 12/1996 Shibata et al. ................ 386/72
5,978,171 A * 11/1999 Shimura .................. 360/77.14
6,704,490 B1 * 3/2004 Shibata ........................ 386/46

FOREIGN PATENT DOCUMENTS

JP     8-55389     2/1996
JP   2000-30324    1/2000

* cited by examiner

Primary Examiner—Andrew L. Sniezek
(74) Attorney, Agent, or Firm—Steptoe & Johnson LLP

(57) ABSTRACT

Track thinning at an IN point of consecutive recording is prevented by doing a head-track one-edge coincidence tracking by using a head of a larger width than the track width. ATF control unit (15) makes a control during reproduction of pre-roll of consecutive recording according to a pilot signal out of the reproduction output from heads (1a, 1c) so that centers of the heads (1a, 1c) may scan the center line of the track. A positioning signal (6g) during the control and a phase of HSW are detected by a detecting circuit (16), and a desired phase having a predetermined advanced amount is set by a desired phase setting unit (18) and stored in a storage unit (19). After this, a tracking method switching control unit (23) switches the tracking method into another by which a control unit (20) controls the difference in phase between the positioning signal (6g) and the HSW to a desired value stored in the storage unit (19).

1 Claim, 14 Drawing Sheets

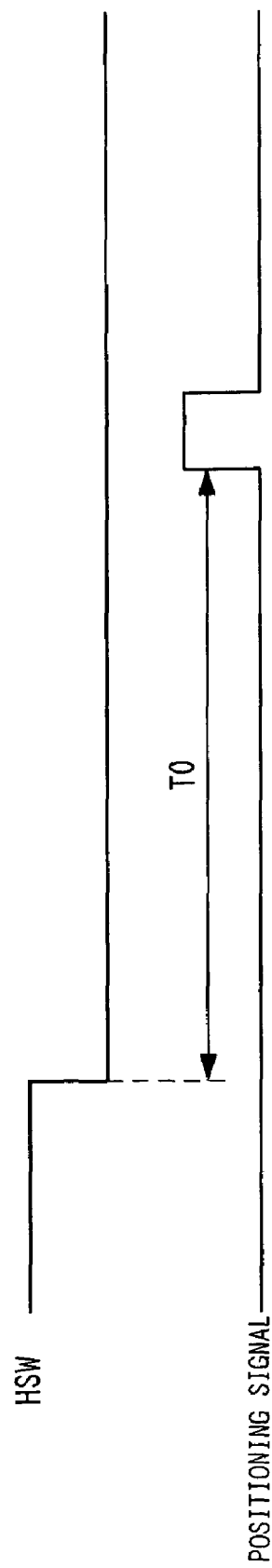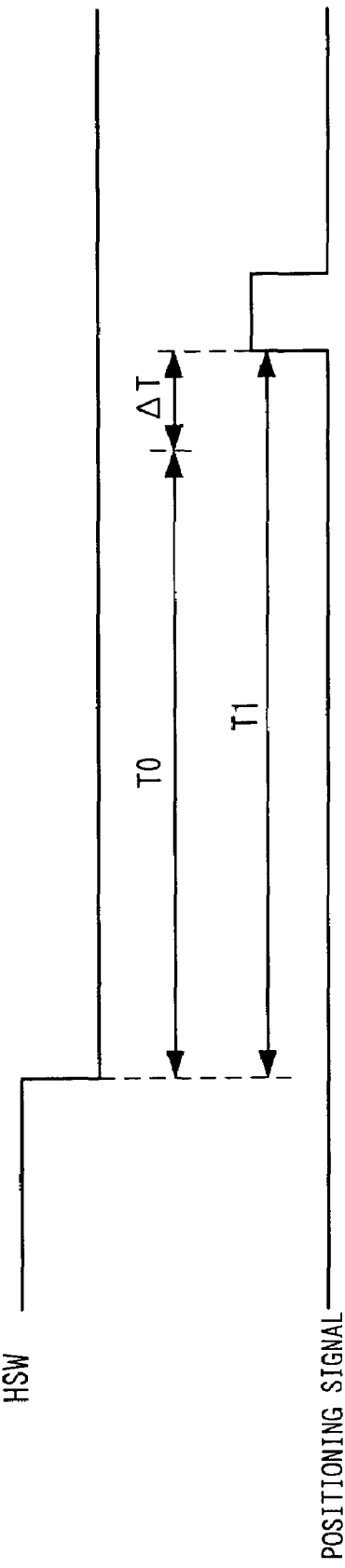
FIG. 5

FIG. 6
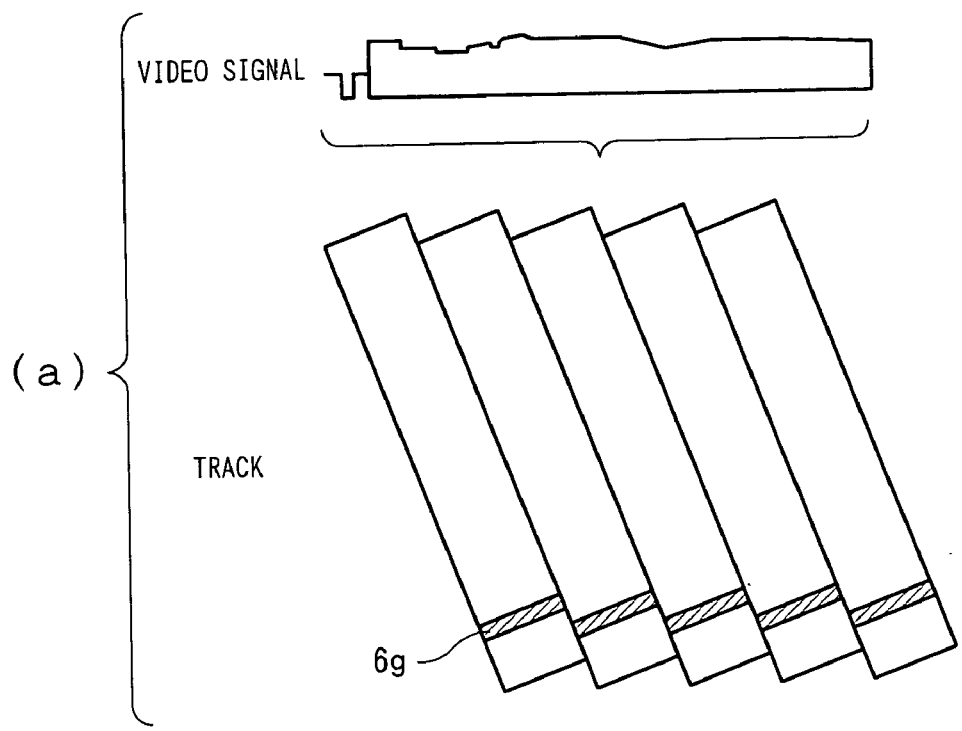
(a)
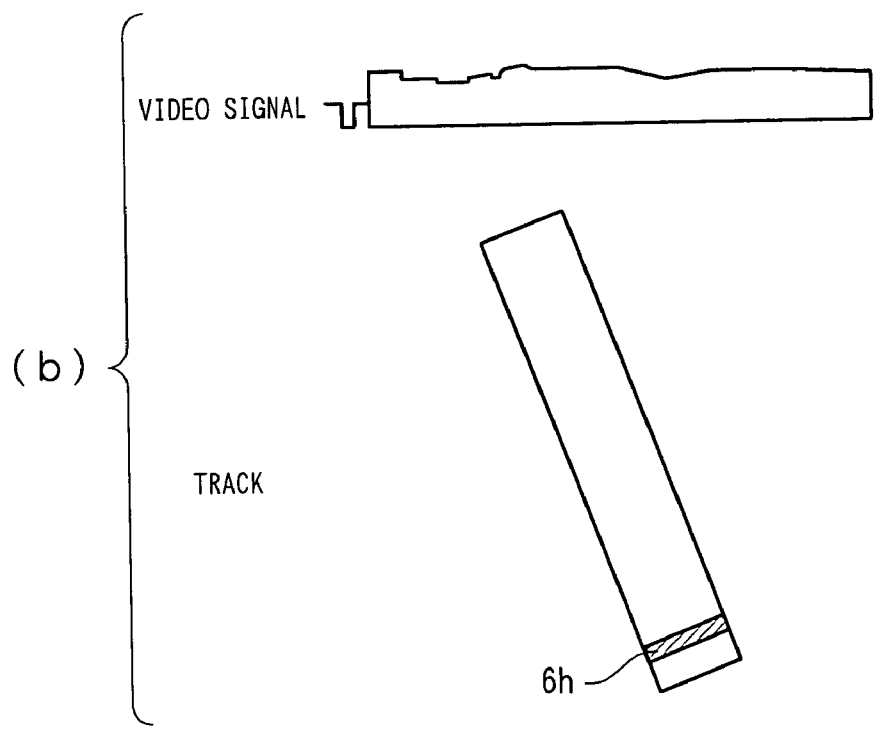
(b)

US 7,046,479 B2

MAGNETIC RECORDING/REPRODUCING DEVICE HAVING POSITION CONTROL

This application is a 371 of PCT/SP01/09799 Nov. 8, 2001.

TECHNICAL FIELD

The present invention relates to a magnetic recording/reproducing apparatus which records and reproduces an image, voice, data, and the like on a magnetic tape.

BACKGROUND ART

Magnetic recording/reproducing apparatuses such as a video tape recorder using a magnetic tape as a medium have been put into practical use and become widely available. Further, various companies have achieved smaller apparatuses and developed digitization with higher density recording. In order to increase a recording density and obtain compatibility, it is important to accurately perform tracking on a head and a track. As a technique for accurately performing tracking, an ATF (Automatic Track Finding) control method has been known as a method replacing a conventional tracking control method using a fixed head and a control signal. The levels of pilot signals leaking from both sides of a track to be scanned by a head during reproduction are compared with each other by frequency-multiplexing or modulating a pilot signal into an information signal for recording, or performing recording in a bursting manner while dividing an area from an information signal, so that tracking control is performed (e.g., Japanese Unexamined Patent Publication No. 59-92460). This method has been already applied and put into practical use for an 8-millimeter VTR, a digital VTR, and so on.

FIGS. 10($a$) and 10($b$) are diagrams showing the operating principle of a conventional magnetic recording/reproducing apparatus.

In FIG. 10($b$), reference numerals 1$a$ and 1$c$ denote heads opposed to each other by 180 degrees on a rotary cylinder 2, reference numeral 3 denotes a PG pulse detector for detecting a rotational phase of the rotary cylinder 2, and reference numeral 4 denotes an FG pulse detector for detecting a rotating speed of the rotary cylinder 2.

In FIG. 10($a$), reference numeral denotes a magnetic tape, reference numerals 6$a$ to 6$c$ denote tracks for recording information signals, and reference numeral 6$f$ denotes a starting track of consecutive recording. Reference numeral 7$a$ denotes a capstan motor which is contact-bonded by a pinch roller 8 and performs feed control of the magnetic tape 5, reference numeral 7$b$ denotes an FG pulse detector of the capstan motor 7$a$, reference numeral 9 denotes a head switching control section for switching the heads 1$a$ and 1$c$ in turn at proper timing, and reference numeral 32 denotes a capstan motor control section which controls a speed of the capstan motor 7$a$ according to an output pulse of the FG pulse detector 7$b$ and performs phase control according to an output of an ATF control unit 15 using a pilot signal included in a reproduction signal of the head 1$a$.

First, referring to FIG. 10($a$), an operation for reproducing a recorded tape will be discussed.

When the head 1$a$ scans the track 6$b$, in addition to an information signal recorded on the track 6$b$, pilot signals f1 and f2 leak into the head 1$a$ from the adjacent tracks 6$a$ and 6$c$. After the pilot signals f1 and f2 included in a reproduction signal of the head 1$a$ are extracted and rectified by band-pass filters 12$a$ and 12$b$ and rectifiers 13$a$ and 13$b$, a difference between the signals is outputted as a tracking error signal by a difference unit 14, and a capstan control circuit 23 performs phase control according to the error signal. In this way, the capstan motor control section 32 performs control so that the center line of the head 1$a$ always scans the center line of a desired track (the track 6$b$ in this example).

Next, a head switch generating operation will be discussed.

As shown in FIG. 10, a head switch generating circuit (hereinafter, referred to as an HSW generating circuit) 10 selects the head for scanning a track by switching a head switch 11 according to pulses PG and FG detected by PG pulse detector 3 and the FG pulse detector 4.

FIG. 11 shows the detailed configuration of the HSW generating circuit 10, and FIG. 12 shows a process of forming a head switching pulse HSW.

The HSW generating circuit 10 is constituted by D flip-flops 33 and 34 and a NOT circuit 35. In this case, an example is illustrated in which PG is outputted one time for one rotation of the rotary cylinder 2 and FG of four periods is outputted. In this example where the two heads are opposed to each other by 180 degrees on the rotary cylinder 2, a head switching pulse HSW is reset at the timing of PG and is formed so that the H/L level is inverted every two periods of FG.

Further, when a recording starting point on a track is determined only by the output of a rotational position sensor of the rotary cylinder 2, erasing occurs partially on an area not to be erased on a previously recorded adjacent track in the case of consecutive recording and inserting edition between magnetic recording/reproducing apparatuses which are different in recording position on a tape due to mechanical variance, an adjustment error, and so on. In order to solve this problem, as shown in FIG. 13, a method is available in which a positioning signal is recorded on a first area of a track and an information signal is recorded on a second area (e.g., Japanese Unexamined Patent Publication No. 8-263940).

Moreover, consecutive recording and inserting edition are performed from a track 6$f$ (FIG. 10) in response to an instruction for starting recording after a proper time tape is reproduced until an editing point and a pre-roll operation is performed for matching a track width and the like on the editing point.

In this way, various companies have achieved smaller magnetic recording/reproducing apparatuses using magnetic tape as a media such as a video tape recorder and developed digitization. Thus, it is necessary to reduce the number of heads mounted on a rotary cylinder in order to achieve a smaller rotary cylinder and reduce the cost. A method has been devised for usually performing all of reproduction, pre-roll reproduction for consecutive recording and edition, and recording by using a head with a width larger than a track width, and a method has been devised for performing recording and reproduction of formats having different track widths by using the head.

In this case, the following problem arises during pre-roll reproduction of consecutive recording and edition: as shown in FIG. 14, since the center line of the head 1$a$ scans the center line of the track 6$b$ under ATF control, when recording is performed in this state, a part originally recorded on the previous track 6$a$ is erased by a width of (Wh−Wt)/2 (diagonally shaded part 6$e$) in the case of head width Wh>track width Wt.

Therefore, as a result of consecutive recording, the last track width of originally recorded substrate tracks is (3·Wt−

Wh)/2, resulting in a thinned track as compared with the other tracks each having a width of Wt. Namely, when consecutive recording is performed by a head having a head width larger than a track width under ATF control, track thinning occurs on a joining point and thus lowers the reproduction level of the track, thereby affecting picture quality and sound quality.

The present invention relates to such a conventional problem and has as its object the provision of a magnetic recording/reproducing apparatus which does not cause track thinning on a joining point even when consecutive recording is performed by a head wider than a track width.

DISCLOSURE OF THE INVENTION

In a magnetic recording/reproducing apparatus of the present invention, control is performed by an ATF control unit according to a pilot signal in reproduction output of a head during pre-roll reproduction of consecutive recording so that the center line of a track is scanned by the center of the head, the phases of a positioning signal and an HSW at that time are detected, a phase target value advanced by a predetermined value is stored, and control is performed so that a phase difference between the positioning signal and the HSW is equal to a target value.

According to the present invention, track thinning at an IN point of consecutive recording can be eliminated by using a head having a width wider than a track width to perform one-edge coincidence tracking between the head and the track.

A magnetic recording/reproducing apparatus according to the first aspect of the present invention is a magnetic recording/reproducing apparatus in which recording is performed to diagonally form tracks along the length of a magnetic tape, a positioning signal is recorded on a first area of the track, an information signal is recorded on a second area, a pilot signal is recorded on a predetermined area of the track, the magnetic tape is reproduced to reproduce the first area the track, a detecting unit is provided for detecting the positioning signal recorded on the first area of the track from the reproduction signal, and information is reproduced and recorded by using a recording/reproducing head having a head width larger than a track width of the track, wherein the apparatus comprises: an ATF control unit for comparing the cross talk levels of the pilot signals from the adjacent tracks to control tracking during reproduction and performing tracking so that the center of the recording/reproducing head and the center of the track coincide with each other in the width direction; a positioning signal phase target setting unit for detecting a phase difference $T0$ between a positioning signal obtained from the track and a switching signal of the recording/reproducing head, and setting a phase advanced by an amount $\Delta T$ which corresponds to (Wh−Wt)/2 from the positioning signal phase as a positioning signal control phase target value, while the ATF control unit causes the centers of the recording/reproducing head and the track to substantially coincide with each other in the width direction; a positioning signal control unit for performing tracking so that the phase of the positioning signal is equal to the phase target value set by the positioning signal phase target setting unit; and a switching unit for switching tracking of the track from the ATF control unit to the positioning signal control unit during pre-roll reproduction of consecutive recording.

According to this configuration, even when consecutive recording is performed by a recording/reproducing head having a head width larger than a track width, a phase of a positioning signal from the track is detected with respect to the recording/reproducing head switching signal under ATF control which compares the cross talk levels of the pilot signals from the adjacent tracks to control tracking during reproduction and performs tracking so that the center of the recording/reproducing head and the center of the track coincide with each other in the width direction, and tracking is controlled to set a phase advanced by a predetermined amount from the positioning signal phase as a positioning signal control phase target value, so that a recorded track is not erased at a joining point.

A magnetic recording/reproducing apparatus according to the second aspect of the present invention is a magnetic recording/reproducing apparatus in which recording is performed to diagonally form tracks along the length of a magnetic tape, a modulated video signal is recorded on the track, the magnetic tape is reproduced to reproduce the track, and a vertical synchronous signal detecting unit is provided for detecting a vertical synchronous signal of a video signal from the reproduction signal, and information is reproduced and recorded by using a recording/reproducing head having a head width larger than a track width of the track, wherein the apparatus comprises: a tracking control unit for performing tracking so that the center of the recording/reproducing head and the center of the track coincide with each other in a width direction during reproduction; a vertical synchronous signal phase target setting unit for detecting a phase difference $T0$ between a vertical synchronous signal obtained from the track and a switching signal of the recording/reproducing head, and setting a phase advanced by an amount $\Delta T$ which corresponds to (Wh−Wt)/2 from the phase of the vertical synchronous signal as a target value of a vertical synchronous signal control phase, while the tracking control unit causes the centers of the recording/reproducing head and the track to substantially coincide with each other in the width direction; a vertical synchronous signal control unit for performing tracking so that the phase of the vertical synchronous signal is equal to the phase target value set by the vertical synchronous signal phase target setting unit; and a switching unit for switching tracking of the track from the tracking control unit to the vertical synchronous signal control unit during pre-roll reproduction of consecutive recording.

According to this configuration, even when consecutive recording is performed by a recording/reproducing head having a head width larger than a track width, a phase of a vertical synchronous signal from the track is detected with respect to the recording/reproducing head switching signal under tracking control which causes the center of the recording/reproducing head and the center of the track to coincide with each other in the width direction during pre-roll reproduction, and tracking is controlled so as to set a phase advanced by a predetermined amount from the vertical synchronous signal phase as a target value of a vertical synchronous signal control phase, so that a recorded track is not erased at a joining point.

A magnetic recording/reproducing apparatus according to the third aspect of the present invention is a magnetic recording/reproducing apparatus in which recording is performed to diagonally form tracks along the length of a magnetic tape, and a recording/reproducing head having a head width larger than the track width of the track is used to reproduce and record information, wherein the apparatus comprises: a head output level detecting unit for detecting a head output level obtained when the track is reproduced by the recording/reproducing head; a head output level-down detecting unit for detecting a reduction in output of the recording/reproducing head, the output being detected by the head output level detecting unit; an offset tracking control unit for changing tracking to an advanced phase until the head output level-down detecting unit detects a reduction in reproduction output of the recording/reproducing head; and a switching unit for switching tracking of the track from the tracking control unit to the offset tracking control unit during pre-roll reproduction of consecutive recording.

According to this configuration, even when consecutive recording is performed by the recording/reproducing head having a head width larger than a track width, tracking is controlled at an advanced phase until the head output is reduced during pre-roll reproduction, so that a recorded track is not erased at a joining point.

BRIEF DESCRIPTION OF THE DRAWINGS

FIG. 5 is a diagram showing a phase relationship between a head switching pulse (HSW) and a positioning signal;

FIG. 6 is a diagram illustrating a recording format of a digital video tape recorder and a recording format of an analog video tape recorder;

PREFERRED EMBODIMENTS

Figure 1:
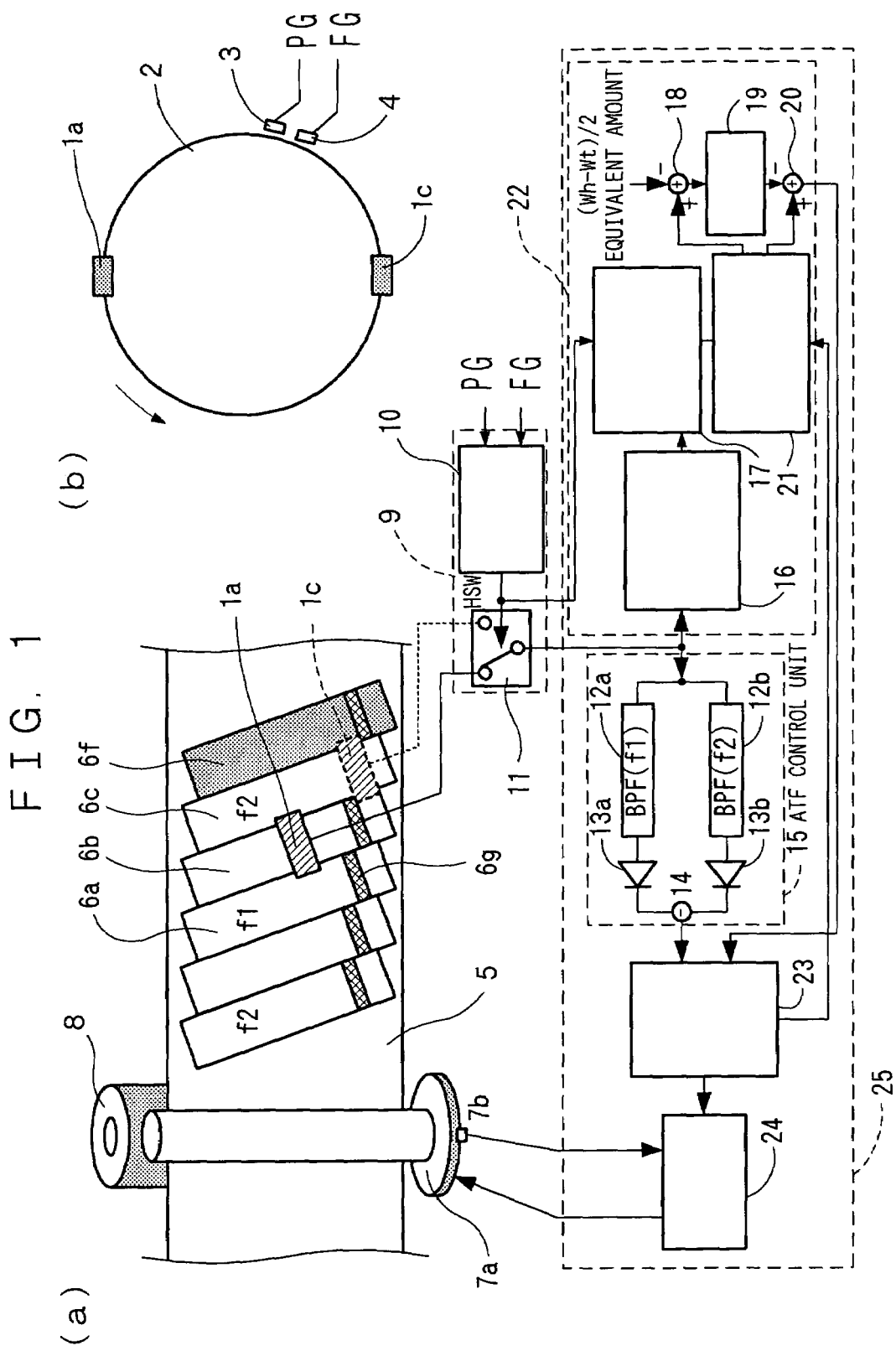
FIG. 1 is a structural diagram showing a reproduction system of a magnetic recording/reproducing apparatus according to (Embodiment 1) of the present invention.

Referring to FIGS. 1 to 9, the following will discuss embodiments of the present invention.

(Embodiment 1)

FIGS. 1 to 5 and 6(a) show (Embodiment 1) of the present invention.

FIGS. 1(a) and 1(b) show a reproduction system of a magnetic recording/reproducing apparatus according to (Embodiment 1).

The present embodiment shows a digital video tape recorder.

The above digital video tape recorder is similar to a digital video tape recorder disclosed in Japanese Unexamined Patent Publication No. 8-263940 regarding a recording system which performs recording to form tracks diagonally with respect to the longitudinal direction of a magnetic tape, records a positioning signal on a first area of the track, records an information signal on a second area, and records a pilot signal on a predetermined area of the track. Thus, the reproduction system having a unique configuration will be discussed below.

FIG. 1(b) shows the periphery of a rotary cylinder 2. Reference numerals 1a and 1c denote heads opposed to each other by 180 degrees on the rotary cylinder 2, reference numeral 3 denotes a PG pulse detector for detecting a rotational phase of the rotary cylinder 2, and reference numeral 4 denotes a FG pulse detector for detecting a rotating speed of the rotary cylinder 2.

In FIG. 1(a), reference numeral 5 denotes a magnetic tape, reference numerals 6a to 6c denote track for recording an information signal, and reference numeral 6f denotes a starting track of consecutive recording. When the track 6a is taken as an example, a positioning signal is recorded on a portion 6g. To be specific, FIG. 6(a) shows the magnetic recording/reproducing apparatus which has a format for recording a video signal of one field on a plurality of tracks. Since no vertical synchronous signal is recorded on a predetermined position of each track, a positioning signal is recorded on the predetermined position (first area) of each track.

Besides, as frequencies f1 and f2 of two kinds of pilot signals that are recorded on every other track, relatively low frequencies (several hundreds kHz) are selected which are less susceptible to an azimuth loss of the head. Further, as a positioning signal, a relatively high frequency (several MHz) is selected which is less affected by an adjacent track.

Reference numeral 9 denotes a head switching control section for switching the heads 1a and 1c at proper timing, reference numeral 15 denotes an ATF control unit for controlling the phase of a capstan motor 7a by using a pilot signal included in a reproduction signal of the head 1a, and reference numeral 22 denotes an offset track control section for performing control so that a phase difference between a positioning signal and an HSW is displaced by an amount equivalent to (Wh−Wt)/2 from a tracking position where the center line of the head and the center line of the track coincides with each other.

The offset track control section 22 has the following configuration.

Reference numeral 16 denotes a positioning signal detecting circuit for detecting a positioning signal recorded on a track, and reference numeral 17 denotes a positioning signal phase detecting circuit for detecting a phase difference between a positioning signal detected by the positioning signal detecting circuit 16 and an HSW signal generated by an HSW generating circuit 10. Reference numeral 21 denotes a target setting control section which performs control to set a target value advanced by a phase equivalent to (Wh−Wt)/2 in the case of head width Wh>track width Wt, so that an end of the head coincides with a boundary of a reproduced track when the phase of the capstan motor 7a is controlled by the ATF control unit 15. Reference numeral 18 denotes a unit for setting a phase target value for a positioning signal and the HSW, reference numeral 19 denotes a storage unit for storing a positioning signal phase target value, reference numeral 20 denotes a positioning signal phase control section for performing control so that the phase of a positioning signal is equal to a target value stored in the storage unit 19, the phase being detected by the positioning signal phase detecting circuit 17.

Reference numeral 23 denotes a tracking method switching control unit for switching the ATF control unit 15 and a tracking method, which uses a phase difference between a positioning signal and the HSW of the offset track control section 22, as a phase control method of the capstan motor 7a. Reference numeral 24 denotes a capstan control circuit which controls a speed of the capstan motor 7a according to an output pulse of an FG pulse detector 7b and performs phase control according to the method switched by the tracking method switching control section 23, and reference numeral 25 denotes a capstan motor control section.

First, referring to FIG. 1, the following will discuss an operation for reproducing a recorded track.

When the head 1a scans the track 6b, in addition to an information signal recorded on the track 6b, pilot signals f1 and f2 leak into the head 1a from the adjacent tracks 6a and 6c. After the pilot signals f1 and f2 included in a reproduction signal of the head 1a are extracted and rectified by band-pass filters 12a and 12b and rectifiers 13a and 13b, a difference between the signals is outputted as a tracking error signal by a difference unit 14, and the capstan control circuit 24 performs phase control according to an error value.

Figure 2:
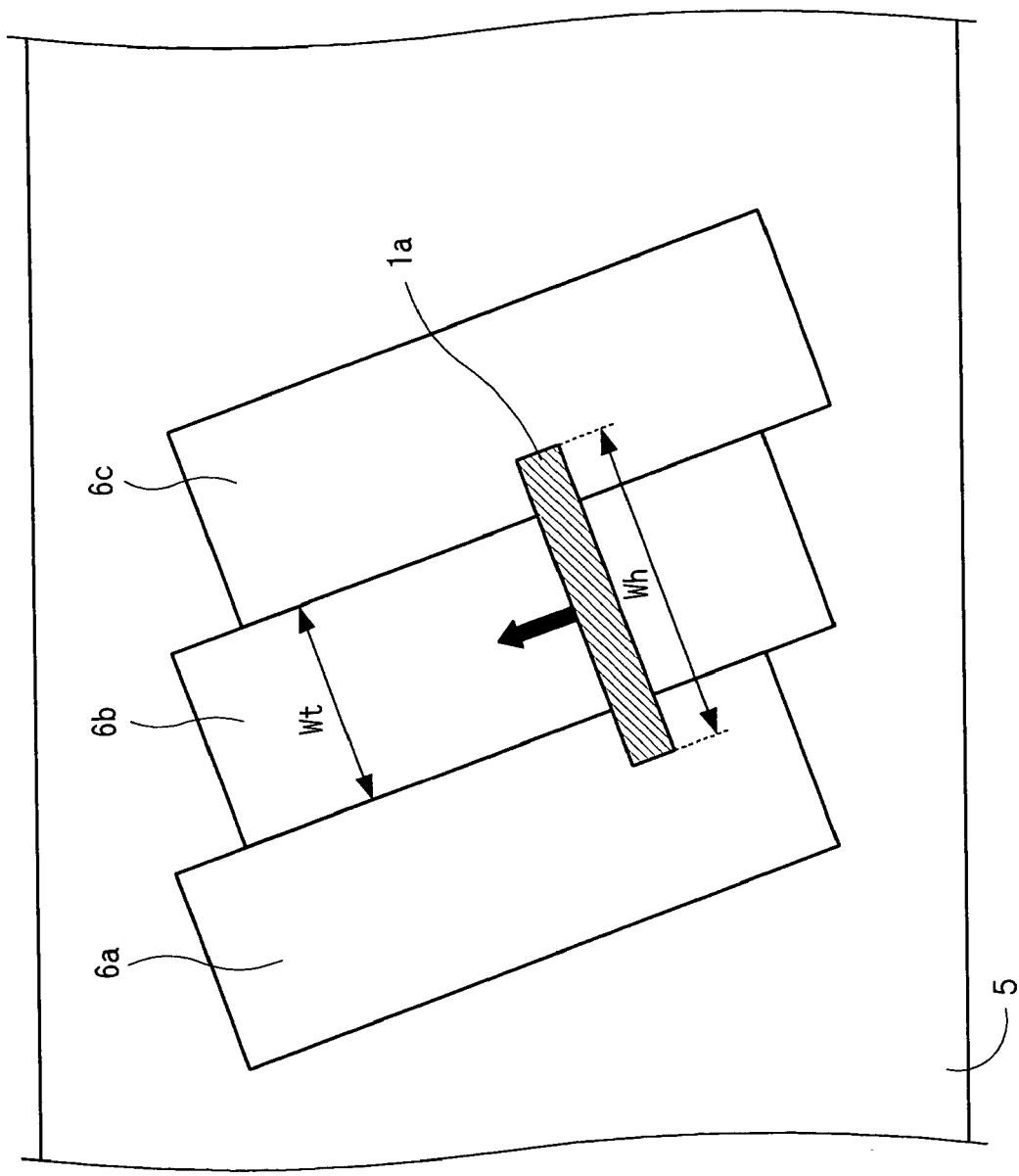
FIG. 2 is a diagram showing a positional relationship between tracks and head scanning during normal reproduction according to the embodiment.

In this way, the capstan motor control section 25 performs control so that the center line of the head 1a always coincides with the center line of the desired track 6b. Namely, as shown in FIG. 2, when the head width Wh is larger than the track width Wt, the adjacent tracks 6a and 6c are each scanned by a width of (Wh−Wt)/2.

Figure 3:
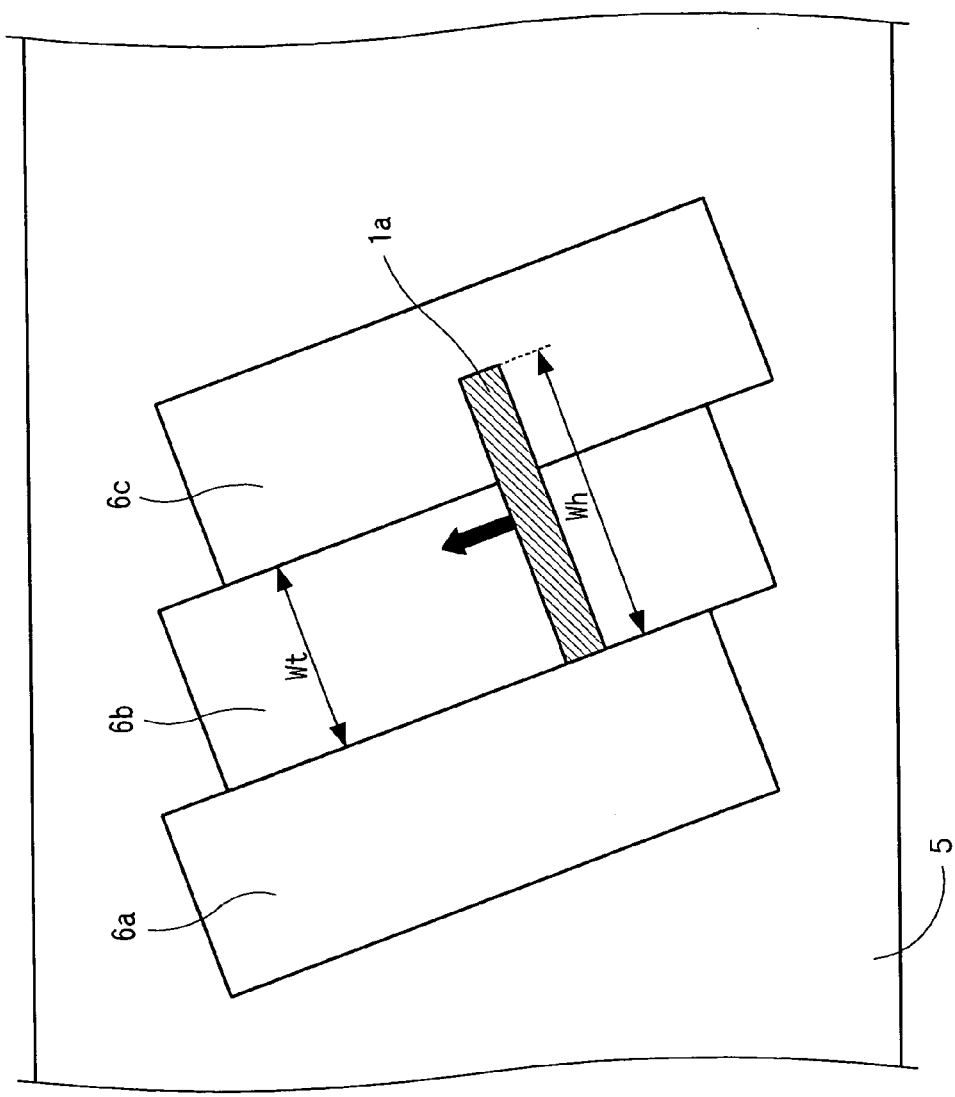
FIG. 3 is a diagram showing a positional relationship between tracks and head scanning when tracking is shifted so that one end of a head scans the boundary of the track according to the embodiment.

Next, as shown in FIG. 3, the following will discuss that case where control is performed to shift tracking so that an end of the head coincides with a boundary of a track being reproduced.

Figure 4:
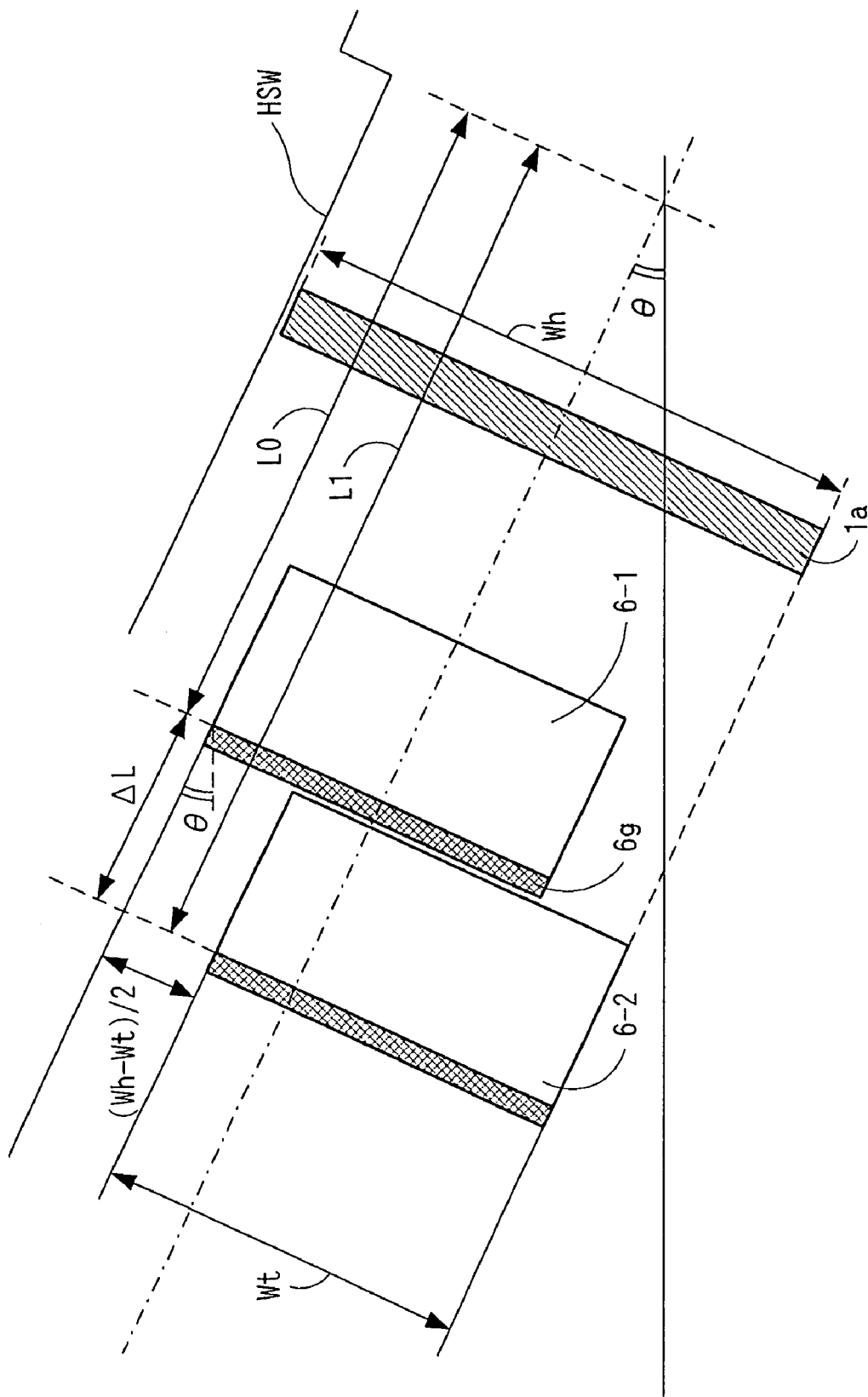
FIG. 4 is a diagram showing a positional relationship of the track with respect to the center line of the head scanning.

FIG. 4 is a view showing the position of a track with respect to the center line of scanning of the head 1a. Reference numeral 6-1 denotes a track whose center line coincides with the center of the head 1a as FIG. 2, and reference numeral 6-2 denotes a track whose boundary coincides with one end of the head 1a as FIG. 3. When a head width is Wh[m], a track width is Wt[m] (Wh>Wt), a track angle is θ[rad], the track 6-1 has a phase difference (length) of L0 [m] and has (time) of T0 [s] between the HSW and the positioning signal 6g on the track, the track 6-2 has a phase difference (length) of L1 [m] and has (time) of T1 [s] between the HSW and the positioning signal 6g on the track, and a phase difference (length) is ΔL [m] and (time) is ΔT [s] between L0 and L1 , since a difference in the width direction between the track 6-1 and the track 6-2 is expressed by (Wh−Wt)/2 [m] the following equation is obtained.

$$\Delta L = \{(Wh-Wt)/2\} \cdot \tan(\pi/2-\theta) [m]$$

When the rotation speed of the head is represented by A[m/s], the following equation is obtained.

$$\Delta T = \{(Wh-Wt)/2\} \cdot \tan(\pi/2-\theta) [s]$$

Therefore, when the ATF control unit 15 controls the phase of the capstan motor 7a, the phase difference T0 between the positioning signal and the HSW is detected as shown in FIG. 5(a), a phase advanced by an amount equivalent to (Wh−Wt) /2, that is, a phase advanced by ΔT is set by the target phase setting unit 18, and the phase is stored in the storage unit 19. Subsequently, the tracking method (phase control) is switched from the ATF control method 15 to the method using a phase of a positioning signal of the offset track control unit 22 by the tracking method switching control section 23, and control is performed by the positioning signal phase control section 20 so that a phase difference between the positioning signal and the HSW is equal to the target value stored in the storage unit 19 as shown in FIG. 5(b).

Besides, the constituent elements of claim 1 are constituted by the following constituent elements shown in FIG. 1.

A detecting unit for detecting a positioning signal recorded on a first area of the track from a reproduction signal is constituted by the positioning signal detecting circuit 16.

A recording/reproducing head having a head width larger than a track width of the track is constituted by the heads 1a and 1c.

A positioning signal phase target setting unit is constituted by the target setting control section 21, which positioning signal phase target setting unit detects a phase difference T0 between a positioning signal obtained from the track and a switching signal of the recording/reproducing head and sets a phase advanced by an amount ΔT corresponding to (Wh−Wt)/2 from the positioning signal phase as a positioning signal control phase target value, while the ATF control unit 15 causes the centers of the recording/reproducing head and the track to substantially coincide to each other in the width direction.

A positioning signal control unit is constituted by the positioning signal phase control unit 20 and the capstan control circuit 24 that perform tracking so that the phase of the positioning signal is equal to a phase target value set by the positioning signal phase target setting unit.

A switching unit is constituted by the tracking method switching control section 23 that switches tracking on the track from the ATF control unit to the positioning signal control unit during pre-roll reproduction of consecutive recording.

The above embodiment described a digital video tape recorder which has a format for recording a video signal of one frame on a plurality of tracks. The present embodiment is similarly applicable to a digital video tape recorder for recording a video signal of one field on a plurality of tracks.

Although a video signal was exemplified in the above description, a magnetic recording/reproducing apparatus for handling data of a computer can be configured in a like manner.

(Embodiment 2)

Figure 7:
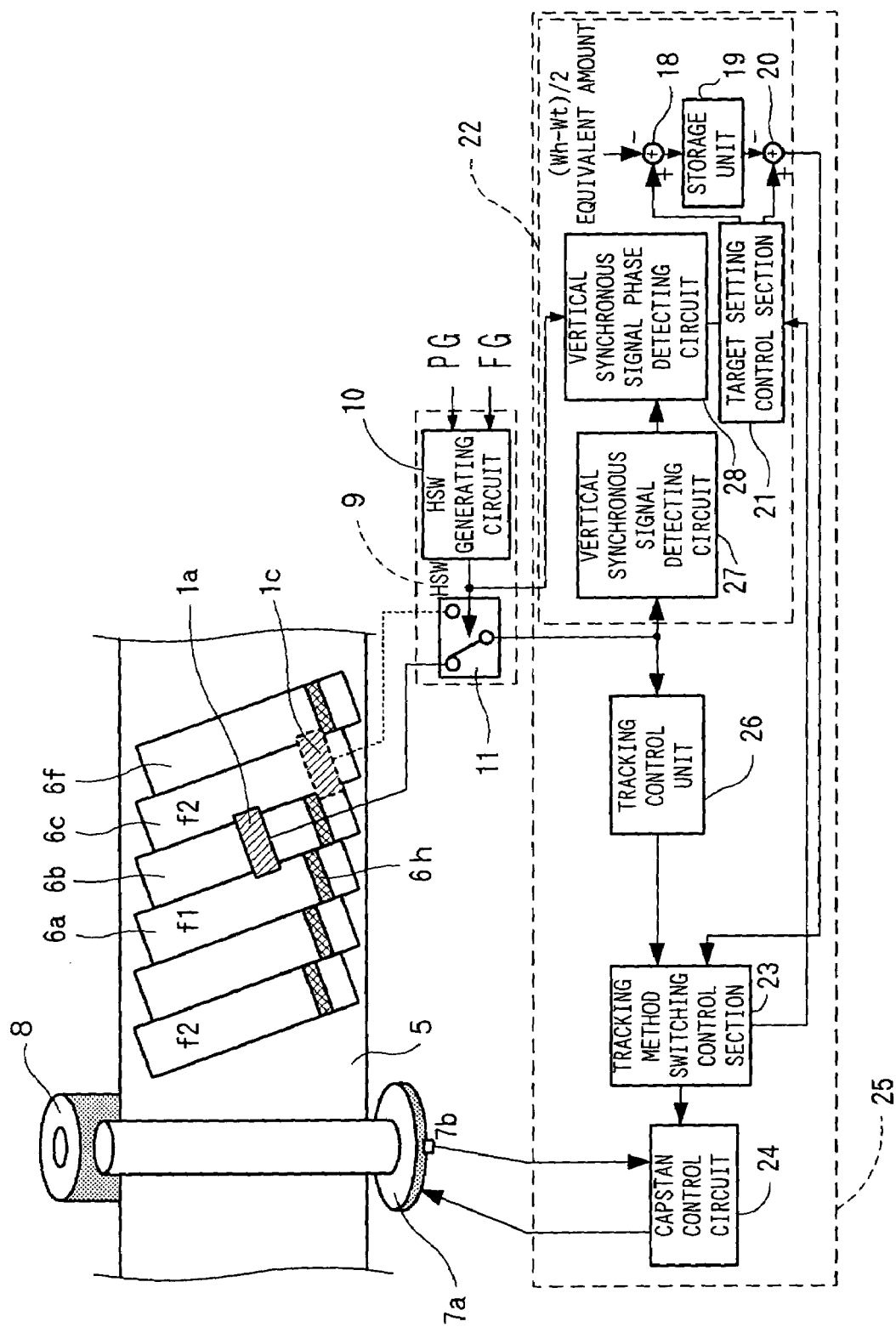
FIG. 7 is a structural diagram showing a reproduction system of a magnetic recording/reproducing apparatus according to (Embodiment 2) of the present invention.

FIGS. 7 and 6(b) show (Embodiment 2) of the present invention.

While (Embodiment 1) described a digital video tape recorder, (Embodiment 2) will describe an analog video tape recorder.

As shown in FIG. 6(b), a magnetic recording/reproducing apparatus is an analog video tape recorder for recording a video signal of one field on a single track. A vertical synchronous signal 6h is recorded on a predetermined position of each track.

Therefore, the positioning signal detecting circuit 16 of FIG. 1 and a vertical synchronous signal detecting circuit 27 shown in FIG. 7 of the present embodiment are different from each other because of different methods of recording signals on tracks but play the same role of detecting a positioning signal recorded on a track.

The other constituent elements having the same functions as those of (Embodiment 1) are indicated by the same reference numerals.

FIG. 7 shows a reproduction system of the analog video tape recorder. Reference numeral 26 denotes a tracking control unit which performs tracking like the ATF control unit 15 so that the centers of the head and the track coincide with each other in the width direction. Here, tracking may use a CTL signal like a video tape recorder of VHS system or may use a pilot signal like an 8-millimeter video tape recorder. Any tracking control is applicable as long as the center of the recording/reproducing head and the center of the track coincide with each other in the width direction during normal reproduction.

Reference numeral 27 denotes a circuit for detecting a vertical synchronous signal recorded on a track, reference numeral 28 denotes a vertical synchronous signal phase detecting circuit which detects a phase difference between a vertical synchronous signal detected by the vertical synchronous signal detecting circuit 27 and an HSW signal generated by the HSW generating circuit 10.

The vertical synchronous signal and HSW of (Embodiment 2) are different from the positioning signal and HSW of (Embodiment 1) in phase and kinds of signals but are similar in that control is performed while shifting tracking so that an end of a head coincides with a boundary of a track being reproduced.

Besides, the constituent elements described in claim 2 of the present invention are constituted by the following constituent elements shown in FIG. 7.

A vertical synchronous signal detecting unit for detecting a vertical synchronous signal of a video signal from a reproduction signal is constituted by the vertical synchronous signal detecting circuit 27.

A recording/reproducing head having a head width larger than a track width of the track is constituted by heads 1a and 1c.

A tracking control unit is constituted by the tracking control unit 26 that performs tracking so that the center of the recording/reproducing head and the center of the track coincide with each other in the width direction during reproduction.

A vertical synchronous signal phase target setting unit is constituted by a target setting control section 21, which vertical synchronous signal phase target setting unit detects a phase difference T0 between a vertical synchronous signal 6h obtained from the track and a switching signal of the recording/reproducing head and sets a phase advanced by an amount ΔT corresponding to (Wh−Wt)/2 from a phase of the vertical synchronous signal as a target value of a vertical synchronous signal control phase, while the tracking control unit causes the centers of the recording/reproducing head and the track to substantially coincide with each other in the width direction.

A vertical synchronous signal control unit is constituted by a positioning signal phase control section 20 and a capstan control circuit 24 that perform tracking so that the phase of a vertical synchronous signal is equal to a phase target value set by the vertical synchronous signal phase target setting unit.

A switching unit is constituted by a tracking method switching control section 23 that switches tracking on the track from the tracking control unit to the vertical synchronous signal control unit during pre-roll reproduction of consecutive recording.

(Embodiment 3)

Figure 8:
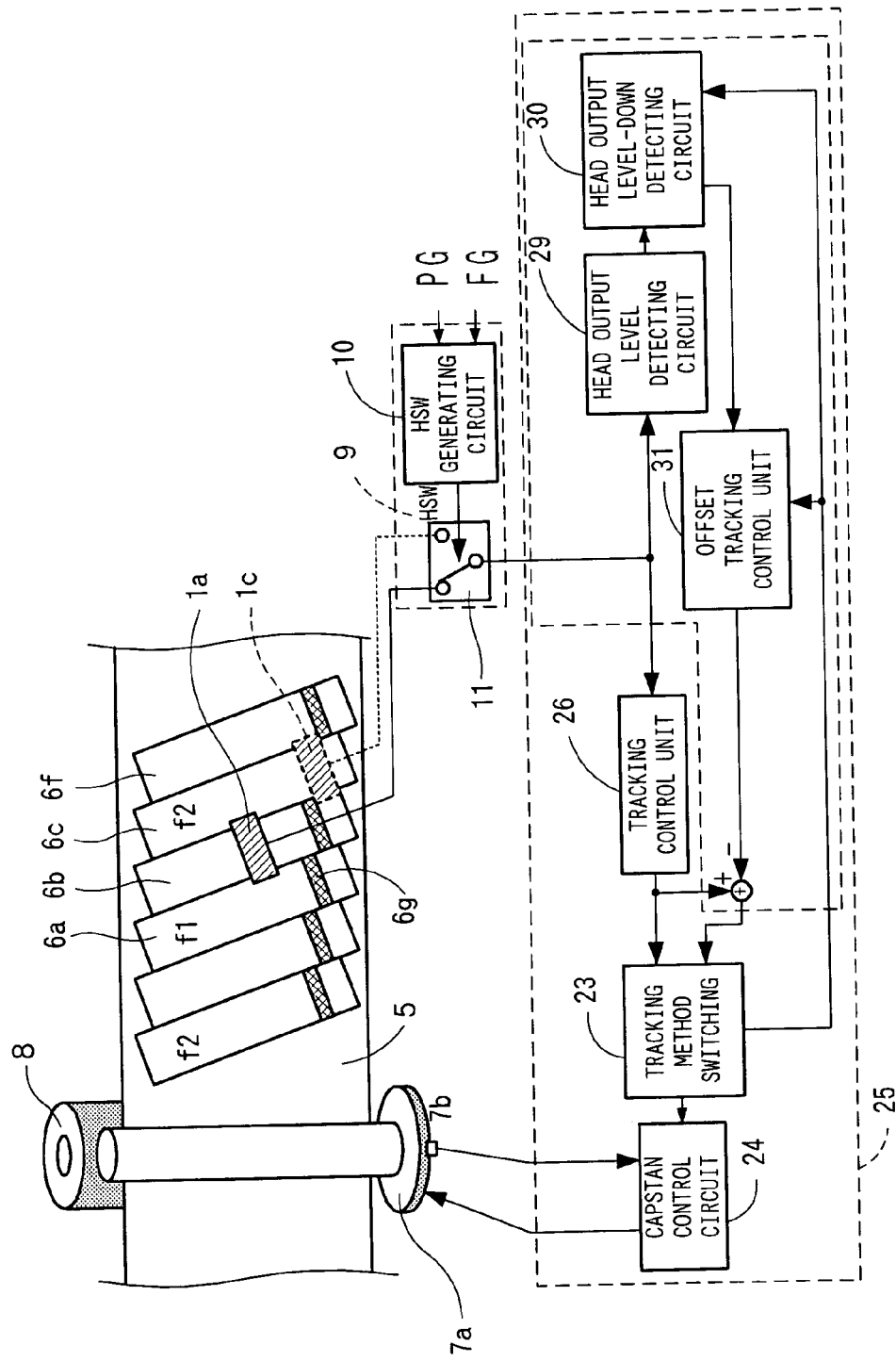
FIG. 8 is a structural diagram showing a magnetic recording/reproducing apparatus not causing track thinning during consecutive recording using a head wider than a track width according to (Embodiment 3) of the present invention.
Figure 9:
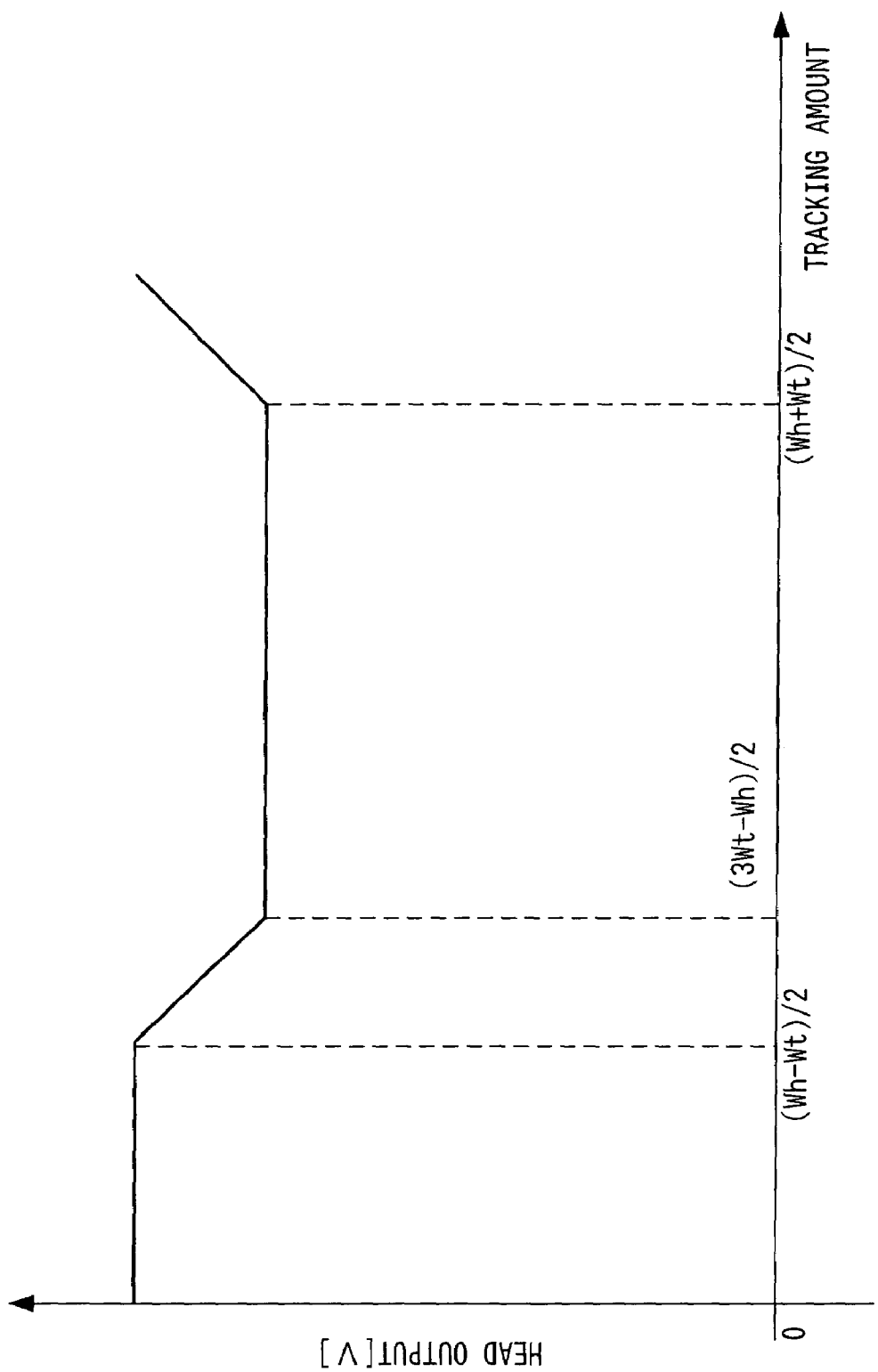
FIG. 9 is a diagram showing a relationship between a tracking amount and a head output according to the same embodiment.
Figure 10:
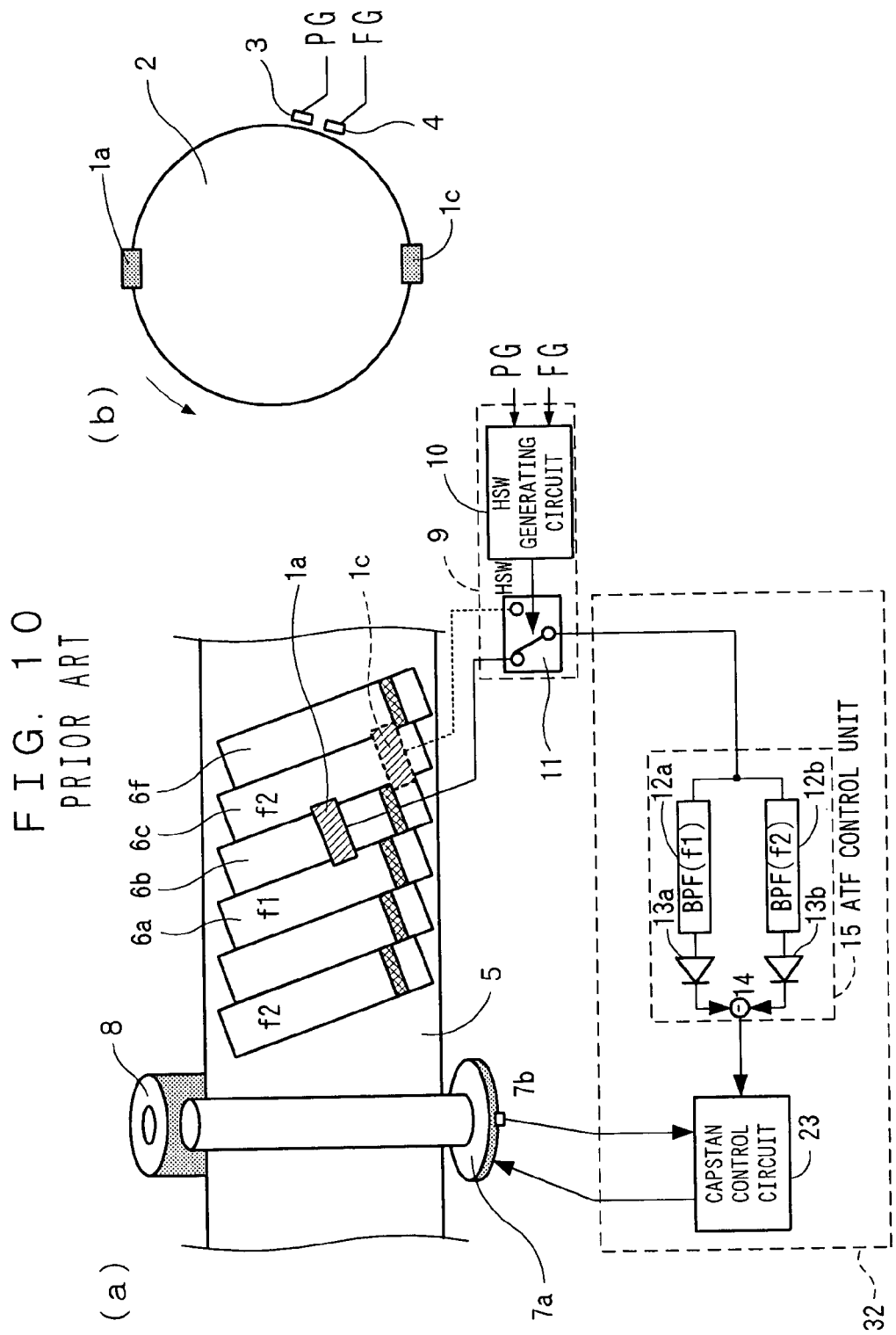
FIG. 10 is a diagram showing an operational principle of a conventional magnetic recording/reproducing apparatus.
Figure 11:
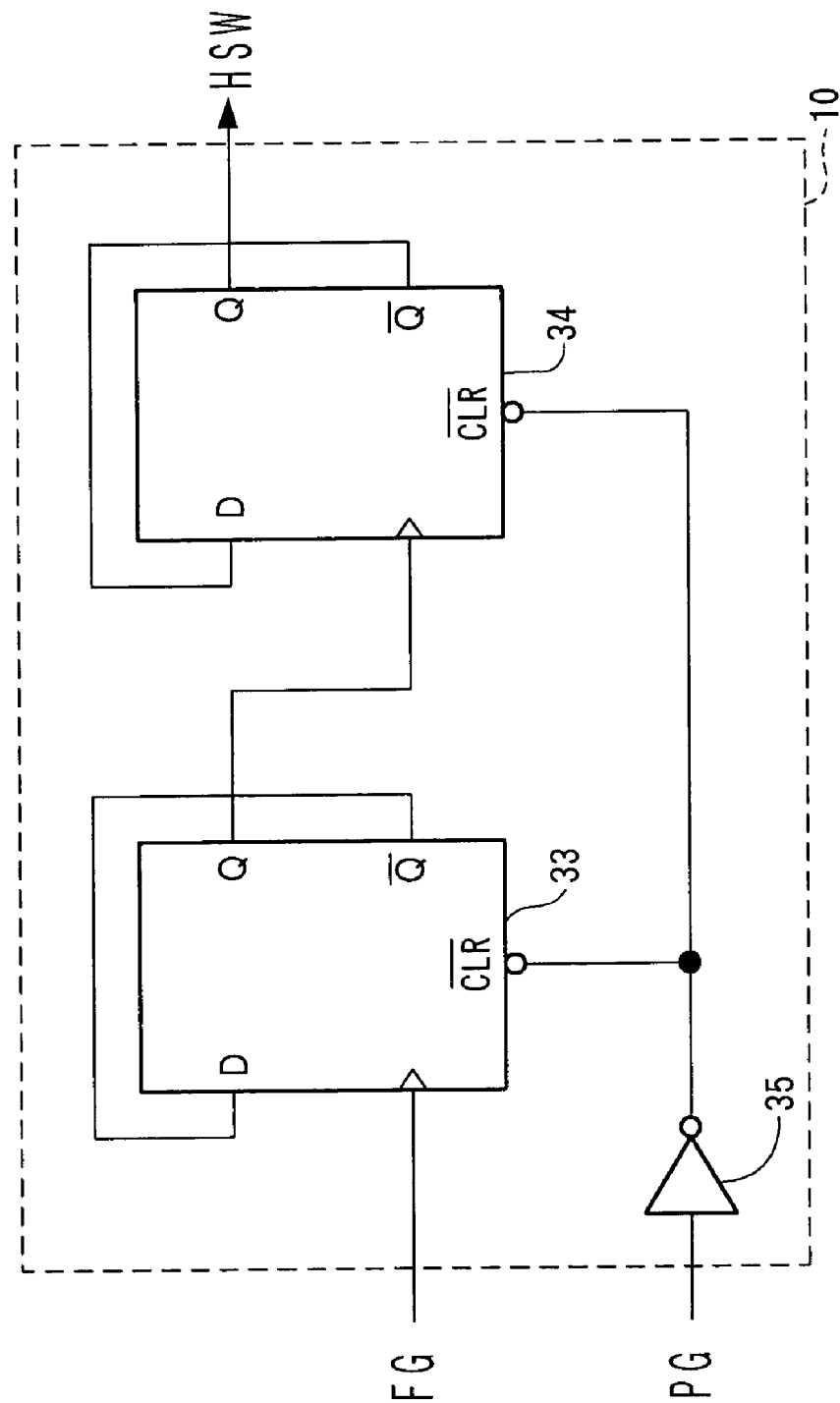
FIG. 11 is a structural diagram showing the head switching pulse (HSW) generation circuit.
Figure 12:
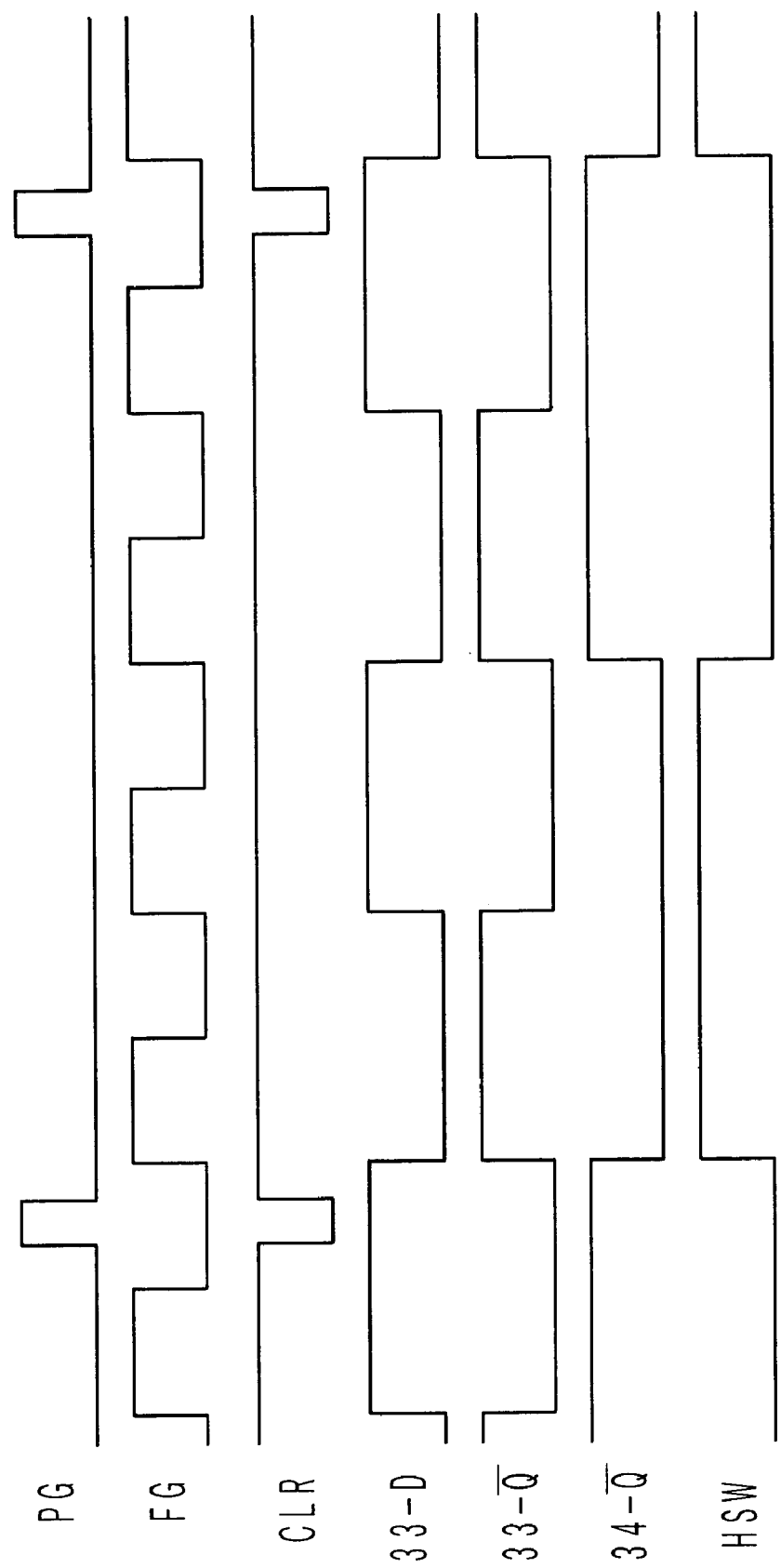
FIG. 12 is a diagram showing a process for generating the head switching pulse (HSW)
Figure 13:
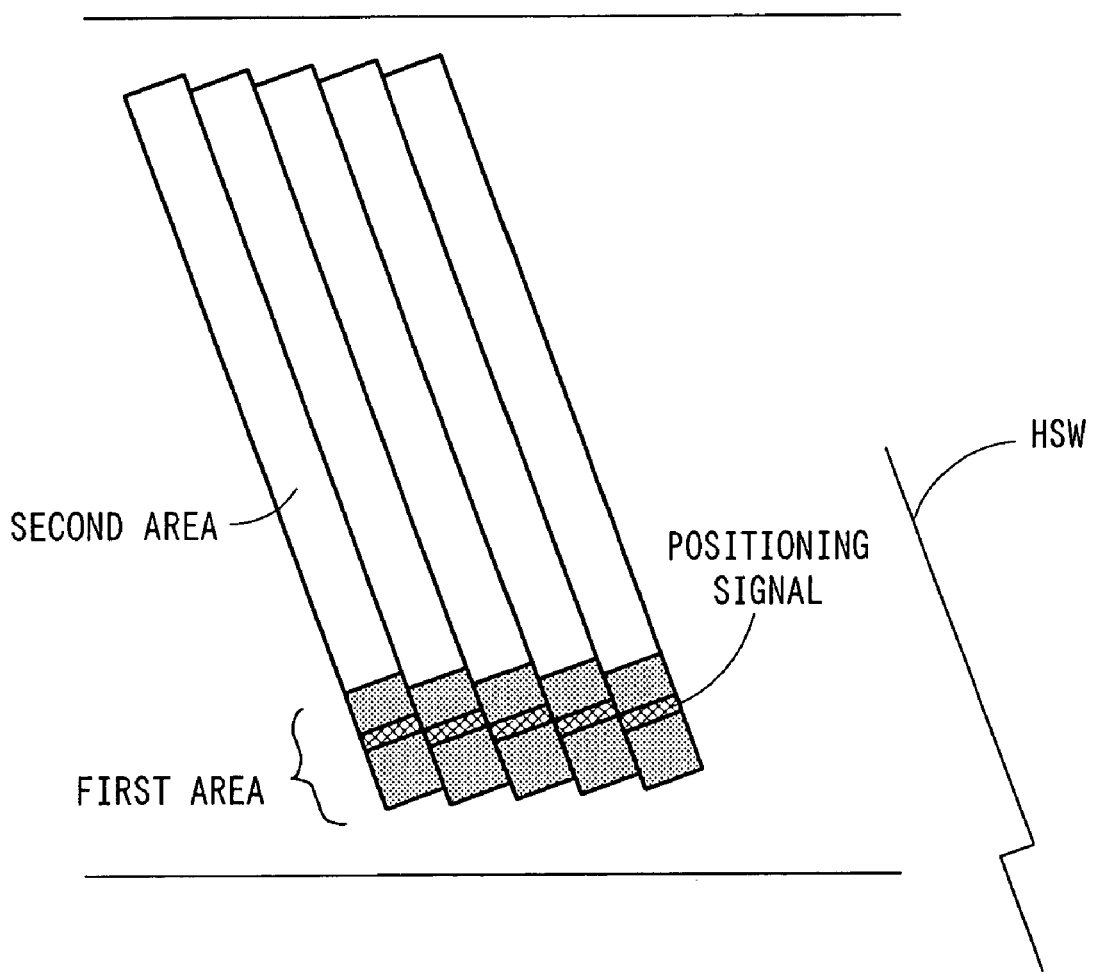
FIG. 13 is a diagram showing positions for recording positioning signals on tracks.
Figure 14:
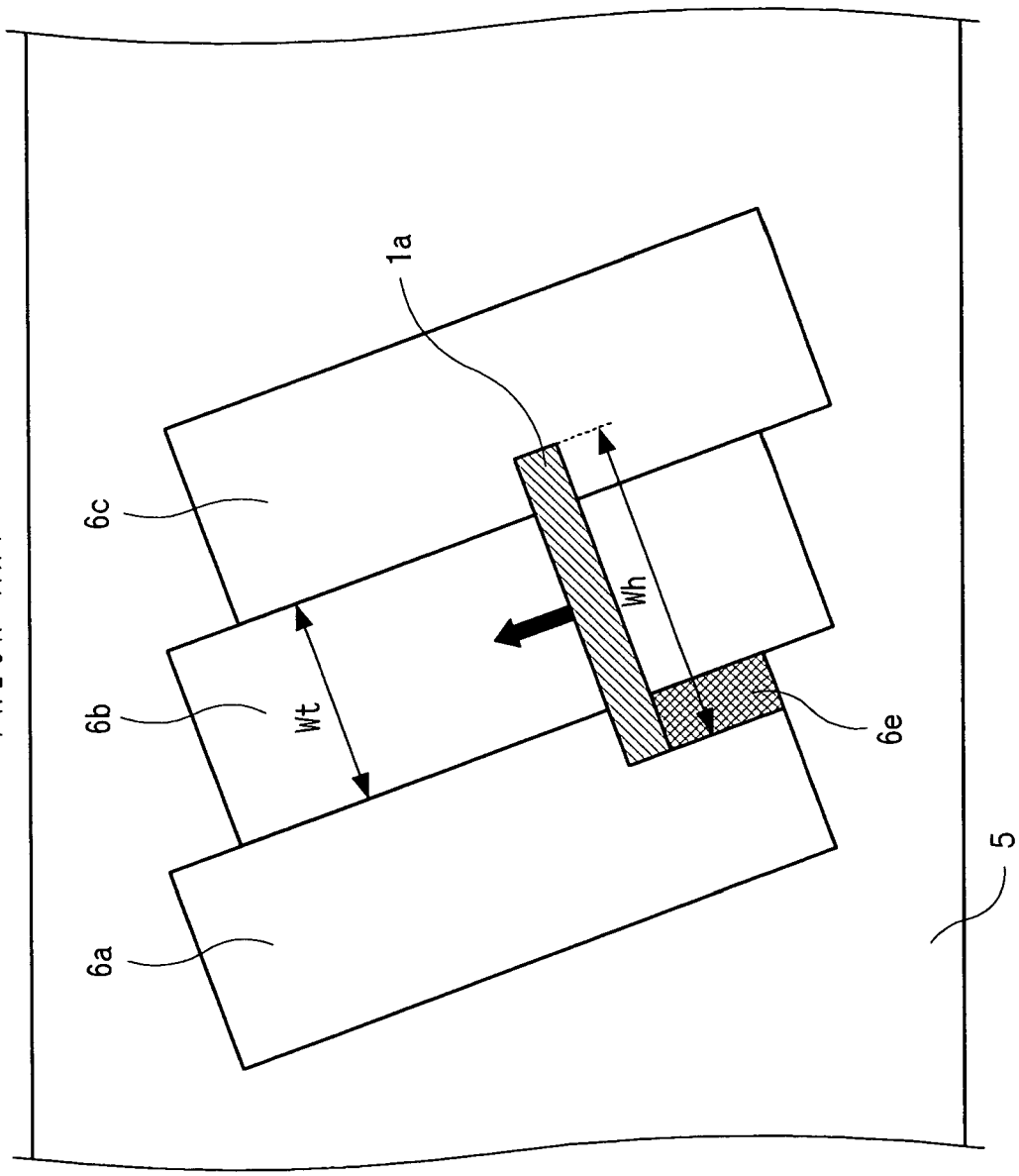
FIG. 14 is a diagram showing head scanning with respect to tracks during consecutive recording using a head wider than a track width in the conventional magnetic recording/reproducing apparatus.

FIGS. 8 and 9 show (Embodiment 3) of the present invention.

The present embodiment uses the relation between output levels of heads regardless of tracking control methods during normal reproduction and whether a positioning signal 6g and a vertical synchronous signal 6h are recorded or not on a track.

Besides, the constituent elements having the same functions as those of (Embodiment 1) are indicated by the same reference numerals.

In FIG. 8, reference numeral 29 denotes a head output level detecting circuit for detecting the output levels of the heads 1a and 1c. Reference numeral 30 denotes a head output level-down detecting circuit which detects that a head output level detected by the head output level detecting circuit 29 is lowered by a certain amount during normal reproduction. Reference numeral 31 denotes an offset tracking control unit which performs control so as to provide a tracking amount with an offset until the head output level-down detecting circuit 30 detects a lowered output level of the heads 1a and 1c.

The following will discuss the operation of the offset tracking control unit 31.

First, the head output level-down detecting circuit 29 measures a head output when tracking control similar to that of normal reproduction is performed during pre-roll reproduction. Next, the tracking method switching control section 23 switches control so that the offset tracking control unit 31 provides a tracking amount with a certain amount of offset, and gradually shifts (increase) tracking.

As shown in FIG. 9, in the case where a head width is Wh and a track width is Wt (Wh>Wt), when a tracking amount is increased while a tracking amount is set at 0 during normal reproduction in which the center line of a head scans the center line of a track, a head output level decreases from a point shifted by (Wh−Wt)/2. The decrease is premised on that the recording/reproducing heads 1a and 1c have different azimuth angles and a track 6b of FIG. 7 and an adjacent track have different azimuth angles and the track 6b of FIG. 7 and an adjacent track have different azimuth angles. The present embodiment uses a characteristic that a head output is not made on parts having different azimuth angles even when tracking is shifted and causes the head to reproduce an adjacent track.

The decrease in head output level indicates that scanning is performed so that an end of the head coincides with a boundary of the track. This point is detected by the head output level-down detecting circuit 30 and the offset tracking control unit 31 is caused to stop increasing a tracking amount, recording is performed before a tracking amount is fixed at a value at that point, and thus consecutive recording can be performed without erasing the previous track.

The constituent elements described in claim 3 of the present invention are constituted by the following constituent elements shown in FIG. 8.

A head output level detecting unit is constituted by the head output level detecting circuit 29. A head output level-down detecting unit is constituted by the head output level-down detecting circuit 30. An offset tracking control unit is constituted by the offset tracking control unit 31. A switching unit is constituted by the tracking method switching control unit 23.

(Embodiment 3) described a digital video tape recorder in FIG. 8 as an example. As described above, regardless of a tracking control method during normal reproduction or regardless of whether the positioning signal 6g and the vertical synchronous signal 6h are recorded or not on a track, the relation between the output levels of the heads is used. Thus, the present embodiment is similarly applicable to an analog video tape recorder.

Each of the above embodiments described an example in which a pilot signal of the ATF control unit is recorded on every other track and f1 and f2 are recorded over the tracks. Even when pilot signals are recorded over the tracks, four kinds of pilot signals are used, or a pilot signal is recorded in a specific area of a track, the embodiments are similarly applicable as long as the control unit permits the center line of the head to scan the center line of a track.

Further, as discussed in the example of (Embodiment 3) in which a signal source of the tracking unit is information from the heads 1a and 1c, the embodiments are similarly applicable to a CTL signal recorded along the length of a tape. Moreover, although the above embodiments discussed an example of the rotary cylinder which is constituted by two heads opposed to each other by 180 degrees, the embodiments are applicable regardless of the number of heads.

As described above, according to the present invention, it is possible to achieve the following advantageous effects: tracking is performed so that one edge of a head coincides with a boundary of a helical track without causing track thinning at the starting point of consecutive recording when consecutive recording is performed by a recording/reproducing head having a width wider than a track width, it is possible to eliminate the necessity for mounting a magnetic head on a rotary cylinder, the head having a head width equal to a track width to perform recording, and thus the size and cost of a rotary cylinder can be reduced.

The invention claimed is:

1. A magnetic recording/reproducing apparatus for recording a diagonally formed track along a length of a magnetic tape, a positioning signal on a first area of a track, an information signal on a second area, and a pilot signal on a predetermined area of a track, and for reproducing the first area of a track, said apparatus comprising:
   a detecting unit for detecting from a reproduction signal the positioning signal recorded on the first area of the track, and a recording/reproducing head having a head width larger than a track width of the track for reproducing information, wherein
   the apparatus further comprises:
   an ATF control unit for comparing cross talk levels of pilot signals from adjacent tracks to control tracking during reproduction and performing tracking so that a center of the recording/reproducing head and a center of a track coincide with each other in a width direction;
   a positioning signal phase target setting unit for detecting a phase difference T0 between a positioning signal obtained from a track and a switching signal of the recording/reproducing head, and setting a phase advanced by an amount $\Delta T$ which corresponds to $(Wh-Wt)/2$, wherein Wh is head width and Wt is track width, from the positioning signal phase as a positioning signal control phase target value, while the ATF control unit causes the centers of the recording/reproducing head and a track to substantially coincide with each other in the width direction;
   a positioning signal control unit for performing tracking so that the phase of the positioning signal is equal to the phase target value set by the positioning signal phase target setting unit; and
   a switching unit for switching tracking of a track from the ATF control unit to the positioning signal control unit during pre-roll reproduction of consecutive recording.

* * * * *